United States Patent [19]
Johannsen

[11] 3,832,050
[45] Aug. 27, 1974

[54] INDICATING MECHANISM FOR A PROJECTION APPARATUS

[75] Inventor: Hans Werner Johannsen, Eichenau, Germany

[73] Assignee: Braum A.G., Frankfurt, Germany

[22] Filed: Feb. 7, 1972

[21] Appl. No.: 224,030

[30] Foreign Application Priority Data
Feb. 12, 1971 Germany............................ 2106602

[52] U.S. Cl. ............................................... 353/42
[51] Int. Cl. ...................... G03b 11/02, G03b 21/26
[58] Field of Search .......... 353/122, 41, 42, 97, 62, 353/39, 11

[56] References Cited
UNITED STATES PATENTS

| | | | |
|---|---|---|---|
| 1,704,811 | 3/1929 | Stuber | 353/42 |
| 2,082,802 | 6/1937 | Karnes | 33/76 VA |
| 3,343,452 | 9/1967 | Ackermann | 353/42 |
| 3,387,372 | 6/1968 | Sabadishin | 33/76 |

Primary Examiner—Harry N. Haroian
Attorney, Agent, or Firm—Ernest F. Marmorek

[57] ABSTRACT

In a picture projection apparatus operable with an objective and an optical arrangement placed along an optical axis for projecting a picture placed between the objective and the optical arrangement the provision of an indicating mechanism including a pair of elongated flat indicating bars of a transparent material extending into the path of the light in a plane between the picture plane and the objective, the indicating mechanism including a drive arrangement for operating the indicating bars by causing each of the indicating bars to sweep the entire picture window area and for bringing the indicating devices to an intersection at any position over the picture area, the indicating bars carrrying a thin strip of less transparent material which during the intersection creates a darker field over the picture detail on the screen without covering such detail.

11 Claims, 4 Drawing Figures

# 3,832,050

INDICATING MECHANISM FOR A PROJECTION APPARATUS

FIELD OF THE INVENTION

The present invention relates to an indicating mechanism for a projection apparatus for indicating details of the projection surface.

BACKGROUND OF THE INVENTION

In order to make it easier to explain certain objects present on the projected picture and for pointing out certain details on such picture, not long ago only an indicating rod was used which later was replaced by a light or optical indicating apparatus which itself is made as a projection apparatus.

The light or optical indicator is considered an advancement over the indicating bar, but still possesses a disadvantage that it had to be in the form of a separate apparatus. Another disadvantage associated with such optical or light indicating apparatus was the fact that it has been very difficult to keep the image of the optical indicator on the detail on the projection surface which is very important in certain cases, such as during the projection of maps, etc.

SUMMARY OF THE INVENTION

It is, therefore, an object of the present invention to provide an indicating mechanism for picture projection apparatus which does not possess the disadvantage associated with the above-described known apparatus.

It is another object of the present invention to provide an indicating mechanism for a picture projection apparatus of the above-described type in which the indicating mechanism itself is integrated into the projection apparatus and forms with it an easily operable and very accurate indicating system.

According to the present invention in the path of light within a picture projecting apparatus between the picture plane and the picture window a pair of movable indicating means is arranged for sweeping the entire surface of the picture and which is provided with means for bringing the indicating means to any point over the surface of the picture window to an intersection with respect to each other.

The present invention provides that the indicating means can move transversely with respect to each other, that is, one in the horizontal direction and the other in the vertical direction and each completely sweeping the surface over the picture window.

The invention in its preferred form provides pivotal mounting of the indicating means at one end thereof for sweeping the surface over the picture window over their free length. In order to avoid a jamming of the indicating means when crossing each other the invention provides that the individual indicating means are offset with respect to each other along the optical axis at least over their length which cross each other.

According to the present invention the operating mechanism for the indicating means is driven by an electromotor.

According to a further feature of the present invention the indicating means along their length which sweep the surface over the picture window are made from a material which is fully transparent and along their center line running longitudinally along the indicating means they are each provided with a partially transparent strip so that when the indicating devices cross each other in the indicating position the partially transparent strips at their cross section provide a precisely visible darker field which still, however, does not block out completely the detail of the picture.

The fact that the invention provides for the operation of the indicating device by an electro-motor makes its use possible in a fully automatic picture projection apparatus and makes also the operation of the indicating devices very comfortable. The operating mechanism according to the present invention includes a driving segment for each indicating device cooperating with a friction wheel which is driven by the electro-motor, both the electro-motor and the friction wheel being mounted on a pendulum-like balancing mechanism which can be brought in selective engagement with one of the driving segments. That is, the friction wheel mounted on the balancing mechanism can be put into driving engagement with one of the driving segments for driving the associated indicating mechanism into a desired position. The operating mechanism further includes a releasable latching means which latches the driving segments in the indicating position and, thereby, the indicating mechanism associated with each of the segments.

The engagement of the friction wheel with one of the driving segments is performed by means of an electromagnet while the return of the friction wheel and the balancing mechanism carrying the motor and the friction wheel is performed by a return spring. According to the invention the friction wheel in its initial position is in engagement with one of the segments and the electro-magnet mentioned above can cause the pendulum-like balancing mechanism to swing over into engagement with the other of the segments to drive the associated indicating mechanism into the indicating position. Upon deenergization of the electro-magnet the pendulum-like balancing mechanism with the friction wheel thereon returns into engagement with the other of the driving segments.

In accordance with the present invention both driving segments and the associated indicating devices are provided with a return spring each of which is in the form of a torsion spring mounted on the driving segment itself and which return springs return the associated indicating device into its initial position when the driving motor and the electro-magnet are deenergized.

The above-mentioned latching mechanism according to the present invention comprises a toothed segment on each of the driving segments and a ratchet or pawl mechanism cooperating with such toothed segment or profile, the pawl or ratchet mechanism being movable in and out of engagement of the toothed profile by means of an electro-magnet and a return spring, whereby a latching of the indicating devices in the indicating position is provided when the pawl is in engagement with the associated toothed profile, or return of the indicating devices to the initial position by the return spring when the pawl is disengaged from its toothed profile by means of the electro-magnet operating a latched release bar.

BRIEF DESCRIPTION OF THE DRAWINGS

The invention will become more readily apparent from the following description of a preferred embodiment thereof shown, by way of example, in the accompanying drawings, in which.

Figure 1:
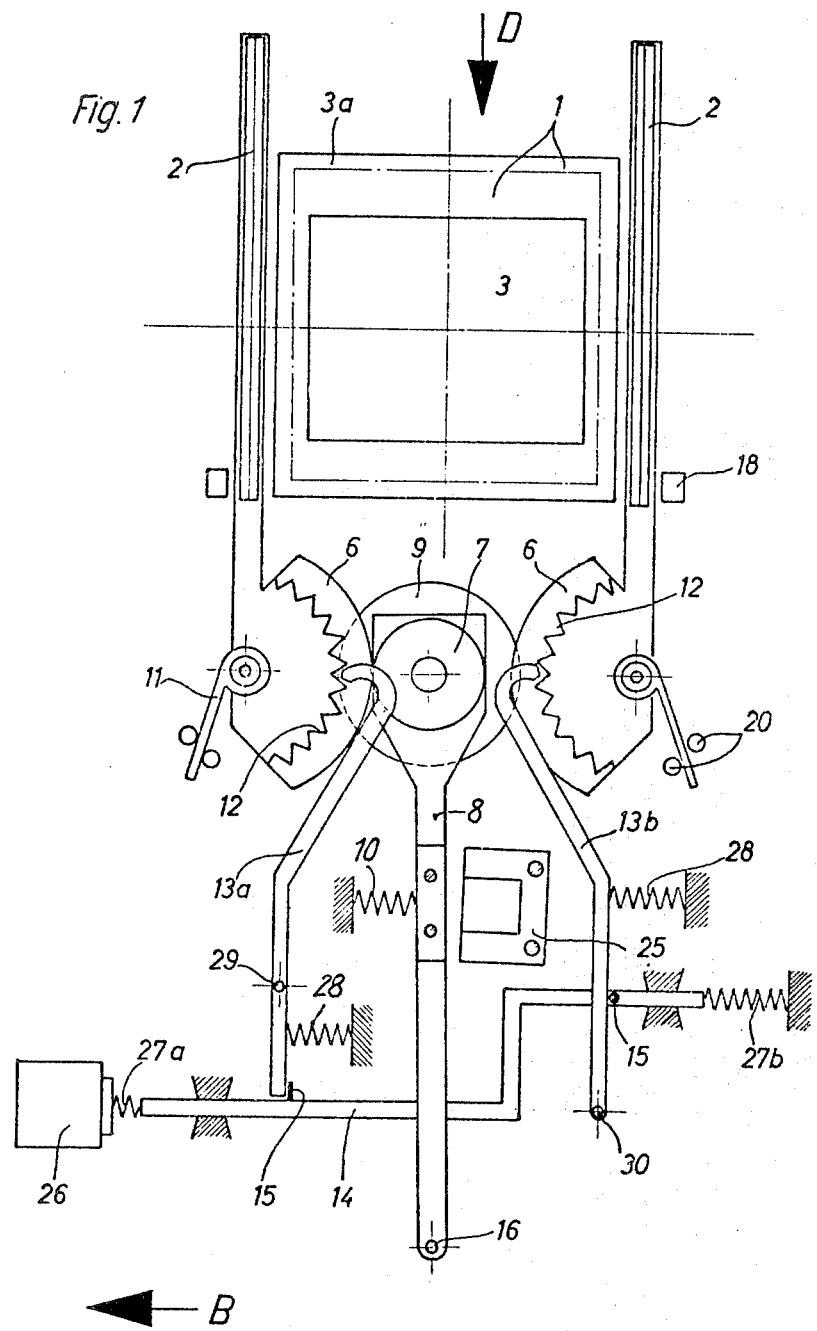
FIG. 1 is a side view of the indicating mechanism according to the present invention in its initial or rest position, viewed in the direction of the picture plane.
Figure 2:
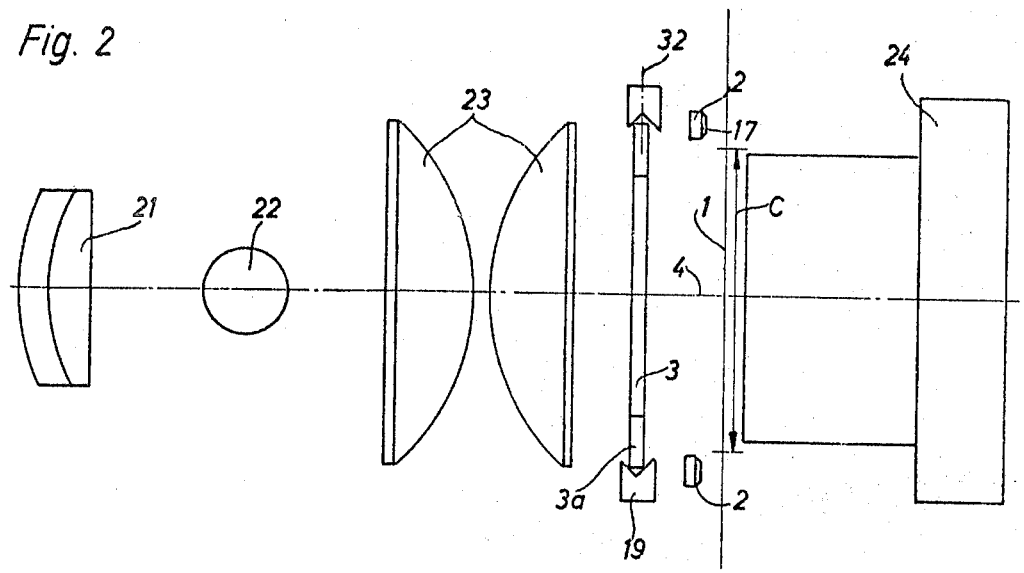
FIG. 2 is a schematic illustration of the position of the indicating mechanism according to the present invention as placed in the path of light within the projection apparatus.
Figure 3:
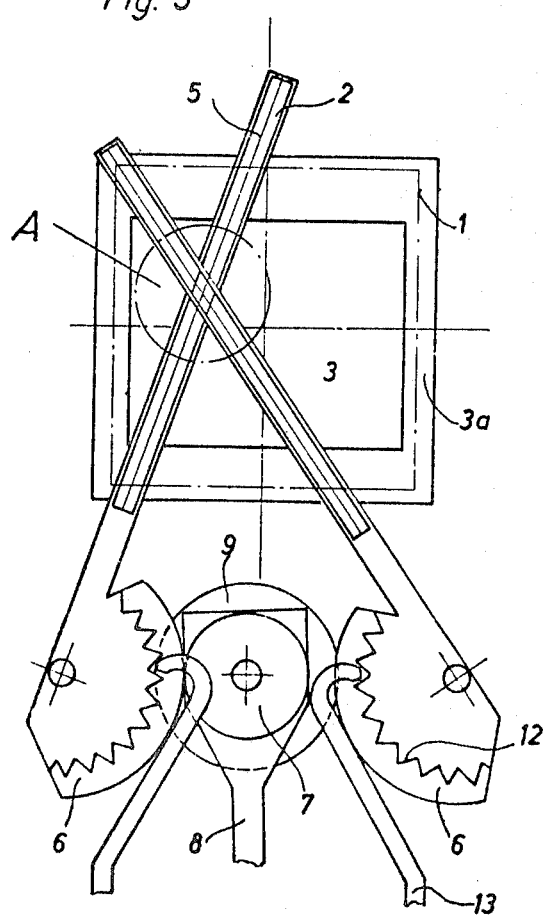
FIG. 3 is a similar illustration as FIG. 1, some parts being omitted for clarity, illustrating the indicating mechanism according to the present invention in an indicating position.

DESCRIPTION OF THE PREFERRED EMBODIMENT:

With reference to FIGS. 1 and 2 it is seen that in a projection apparatus along the optical axis between the picture plane 32 and the picture window 1 a pair of flat indicating webs or rods 2 are placed in a position with respect to the entire apparatus as illustrated in FIG. 2 and made capable of individually sweeping over the entire area of the picture window 1. The picture 3 which is being projected here is represented by a diapositive or transparency placed in a frame 3a and is moved into the picture plane 32 and into the optic axis 4 by one of the well known motor or hand operated changing mechanism 19. The scale C gives the width of the picture window 1 in FIG. 2. In FIGS. 1 and 3 the picture window 1 cannot be seen but it is indicated with respect to its position by the dashed line. Along the optical axis 4 mentioned above a concave mirror 21, a light source 22 and condenser lenses 23 are also placed along the optic axis 4 together with an objective or projecting lens system 24.

With reference to FIG. 2, the indicating webs or bars 2 can be seen with their front tips only and also in the rest position as in FIG. 1. The indicating webs or bars 2 are made from a clear glass or synthetic material and are fully transparent over their body portion which sweeps the picture plane with the exception of a strip 5 placed along the center line of each indicating web which in turn is partially transparent. The edges 17 of the indicating webs 2 are chamfered in order to ease the passing or gliding of the webs 2 over each other during the indicating process.

The indicating webs or bars 2 are fixedly coupled each with a driving segment 6 journaled about the same journal point as the indicating devices 2 themselves. The driving segments 6 are part of the operating mechanism for the indicating bars 2 which cause their sweeping over the picture plane. The operating mechanism further includes a friction wheel 7 which is driven by an electric motor 9, preferably a d.c. motor, and which can be selectively brought into engagement with either the left or the right segments 6 for driving them selectively. The driving motor 9 and the friction wheel 7 are both mounted on a pendulum-like balancing mechanism 8 which is pivotably journaled about a fixed point 16.

In the initial position the friction wheel 7 lies against the left driving segment 6 (FIG. 1) in a steady fashion. In order to bring one of the indicating bars 2 into an indicating position, the motor 9 is turned on by a handle and causes the friction wheel 7 to rotate the segment 6 on the left and thereby one of the indicating bars 2. In the illustration of FIG. 1, the left indicating bar 2 will thereby sweep along the picture window until its partially transparent strip 5 reaches the particular detail in the picture and is caused to lie over such detail in the projected picture.

Figure 4:
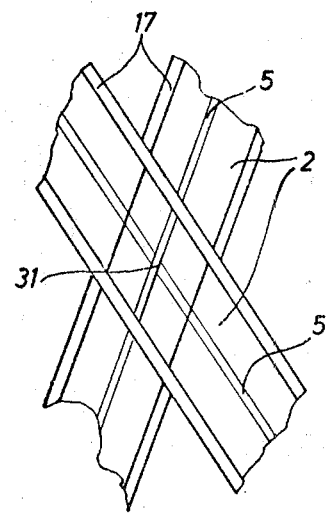
FIG. 4 is an illustration on an enlarged scale of the field A in FIG. 3.

Then similarly as above, operated by a manual switch, a magnet 25 becomes excited and thereby will pull the balance 8 with the friction wheel 7 into driving engagement with the segment on the right side in the illustration of FIG. 1, so that now the right indicating bar 2 becomes moved with its partially transparent strip 5 to the detail in the picture and is caused to lie over it. In the intersected areas of the two partially transparent strips 5 of the indicating bars 2 a relatively dark field 31 is created which will mark the desired detail although it will not completely cover it. (FIGS. 3 and 4). The motor 9 is now turned off and the current to the magnet 25 is discontinued. A spring means 10 returns the balancing mechanism 8 into its initial position.

With reference to FIGS. 1 and 2 it is seen that a toothed profile 12 is formed on the segments 6 which cooperates with a ratchet mechanism 13a and 13b which can be resiliently moved in and out of the toothing 12 by means of springs 28. Thus the ratchet 13a, 13b engages the toothing 12 of the driving segments 6 and thereby the indicating bars 2 are held in the position where they were placed by the friction wheels 7. On the other hand, by causing a magnet 26 to be energized by operating means which can be automatically coupled with the picture changing mechanism, the magnet 26 will pull a bar 14 against the force of return springs 27a and 27b into the direction of the arrow B. A camming means 15 provided on the bar 14 will engage and thereby release the ratchet or pawl members 13a and 13b from the toothing 12 of both of the driving segments 6, since the pawl members 13a and 13b can be pivoted about the points 29 and 30. The segments 6 with their indicating parts 2 return under the force of the return springs 11 having their ends fixed at 20, into the initial position (FIG. 1). Such initial position is limited by the bosses 18. As soon as the circuit is deenergized supplying the magnet 26 with energizing current, the return springs 27a and 27b will return the bar 14 also in its initial position.

The return of the driving segments 6 into their initial or rest position can be caused also by appropriate shaping and weight distribution of the segments 6.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a picture projection apparatus operable with an objective and an optical arrangement placed along an optical axis for projecting a picture placed between the objective and the optical arrangement, the combination comprising an indicating mechanism including a pair of indicating means extending into the path of the light in a plane between the picture plane and the objective, said indicating mechanism comprising means for operating said indicating means by causing each of said indicating means to sweep the entire picture window area and for bringing said indicating means to an intersecting position at any point over said picture window, said operating means comprising an electro-motor for driving said indicating means, said operating mechanism comprises a driving segment fixedly coupled to each of the pivoted end portions of said indicating means, a pendulum-like driving means comprising said electro-motor and a friction wheel, said pendulum-like driving means being pivotably mounted at one end thereof and being adapted to pivot said friction wheel thereon at an initial position into driving engagement with one of said segments associated with one of said indicating means, electromagnetic means mounted adjacent said pendulum-like driving means for causing, when energized, said pendulum-like driving means to move into engagement with the other one of said driving segments to cause movement of the associated indicating means into a desired indicating position over said picture area, and including releasable latching means for latching said indicating means in the indicating position.

2. The combination as claimed in claim 1, wherein said pendulum-like driving means has a spring means coupled thereto for returning said driving means into an initial position when said electro-magnet is deenergized.

3. The combination as claimed in claim 1, wherein said releasable latching mechanism comprises a toothed segment means fixedly mounted on said driving segment means, a ratchet means arranged for cooperation with each of said toothed segment means and thereby fixing said indicating means in the indicating position when said ratchet means engages said toothed segment means, a spring means biasing said ratchet means into engagement with said toothed segment means, an electro-magnet means operable, when energized, to release said ratchet means from engagement with said toothed segment, and a return spring means associated with each driving segment means for returning the associated indicating device into an initial position when said ratchet means disengages said toothed segment means.

4. The combination as claimed in claim 3, wherein said releasable latching means comprises a movable bar operable with said electro-magnet and having a camming arrangement thereon for engagement with an end portion of said ratchet means and moving said ratchet means out of engagement with said toothed segment means when said electromagnet is energized.

5. In a picture projection apparatus operable with an objective and an optical arrangement placed along an optical axis for projecting a picture placed between the objective and the optical arrangement, the combination comprising an indicating mechanism including a pair of elongated indicating means each pivotally mounted at one end and extending into the path of the light in a plane between the picture plane and the objective, said indicating mechanism comprising an electromotor for operating said indicating means by causing each of said indicating means to sweep the entire picture window area and for bringing said indicating means to an intersecting position at any point over said picture window, a driving segment fixedly coupled to each of the pivoted end portions of said indicating means, a pendulum-like balancing means comprising said electro-motor and a friction wheel, said pendulum-like balancing means being pivotably mounted at one end thereof and being adapted to pivot said friction wheel thereon at an initial position into driving engagement with one of said segments associated with one of said indicating means, electromagnetic means mounted adjacent said pendulum-like balancing means for causing, when energized, said pendulum-like balancing means to move into engagement with the other one of said driving segments to cause movement of the associated indicating means into a desired indicating position over said picture area, and including releasable latching means for latching said indicating means in the indicating position.

6. The combination as claimed in claim 5, wherein said releasable latching mechanism comprises a toothed segment means fixedly mounted on said driving segment means, a ratchet means arranged for cooperation with each of said toothed segment means and thereby fixing said indicating means in the indicating position when said ratchet means engages said toothed segment means, a spring means biasing said ratchet means into engagement with said toothed segment means, an electro-magnet means operable, when energized, to release said ratchet means from engagement with said toothed segment, and a return spring means associated with each driving segment means for returning the associated indicating device into an initial position when said ratchet means disengages said toothed segment means.

7. The combination as claimed in claim 6, wherein said releasable latching means comprises a movable bar operable with said electro-magnet and having a camming arrangement thereon for engagement with an end portion of said ratchet means and moving said ratchet means out of engagement with said toothed segment means when said electro-magnet is energized.

8. The combination as claimed in claim 5, wherein one of said indicating means is mounted for movement in the horizontal direction and the other of said indicating means is mounted for movement in the vertical direction over said picture surface.

9. The combination as claimed in claim 5, wherein means are provided for mounting each of said indicating means at one end thereof for pivotably sweeping the entire picture area individually.

10. The combination as claimed in claim 5, wherein said indicating means are offset with respect to each other along the optical axis of said apparatus for clearing each other during intersection during said sweeping.

11. The combination as claimed in claim 5, wherein each of said indicating means comprises a flat elongated bar made from a fully transparent material at least at the portion thereof which sweeps the picture area, a strip means provided on each of said indicating means and made from a partially transparent material.

\* \* \* \* \*

UNITED STATES PATENT OFFICE
CERTIFICATE OF CORRECTION

Patent No. 3,832,050                Dated August 27, 1974

Inventor(s) Hans Werner Johannsen

It is certified that error appears in the above-identified patent and that said Letters Patent are hereby corrected as shown below:

in item (73) on the cover page, before "A.G.", change "Braum" to --Braun--.

Signed and sealed this 3rd day of December 1974.

(SEAL)
Attest:

McCOY M. GIBSON JR.
Attesting Officer

C. MARSHALL DANN
Commissioner of Patents